United States Patent
Liu et al.

(10) Patent No.: US 7,828,469 B2
(45) Date of Patent: Nov. 9, 2010

(54) LIGHT SOURCE MODULE OF PROJECTOR

(75) Inventors: I-Hsien Liu, Hsin-Chu (TW); Tzu-Tse Huang, Hsin-Chu (TW)

(73) Assignee: Coretronic Corporation, Hsinchu (TW)

( * ) Notice: Subject to any disclaimer, the term of this patent is extended or adjusted under 35 U.S.C. 154(b) by 145 days.

(21) Appl. No.: 12/318,703

(22) Filed: Jan. 7, 2009

(65) Prior Publication Data

US 2009/0196040 A1    Aug. 6, 2009

(30) Foreign Application Priority Data

Feb. 4, 2008    (TW) .............................. 97104140 A

(51) Int. Cl.
*F21V 15/00* (2006.01)
*F28F 1/30* (2006.01)
*G03B 21/14* (2006.01)

(52) U.S. Cl. .................. 362/377; 362/373; 362/310; 362/294; 362/376; 165/182; 353/119

(58) Field of Classification Search ............... 362/373, 362/143, 97.1, 97.4, 310, 377, 294, 96, 376; 353/49, 97, 100, 101, 119, 57, 58, 60, 61, 353/87

See application file for complete search history.

(56) References Cited

U.S. PATENT DOCUMENTS

| | | | | |
|---|---|---|---|---|
| 2,186,618 A * | 1/1940 | Philips | ...................... | 352/202 |
| 2,288,345 A * | 6/1942 | De Vry et al. | ............... | 362/294 |
| 2,385,526 A * | 9/1945 | McNabb | ..................... | 362/294 |
| 3,792,919 A * | 2/1974 | Holmes et al. | ................. | 352/72 |
| 4,925,295 A * | 5/1990 | Ogawa et al. | ................. | 353/57 |
| 6,509,674 B1 * | 1/2003 | Nakagawa | ................... | 313/113 |
| 7,040,763 B2 * | 5/2006 | Shiraishi et al. | ............... | 353/60 |
| 7,559,657 B2 * | 7/2009 | Arboix | ........................ | 353/61 |
| 2007/0025107 A1 * | 2/2007 | Kavanagh | .................... | 362/294 |

FOREIGN PATENT DOCUMENTS

| | | |
|---|---|---|
| TW | 444899 | 9/1987 |
| TW | 446274 | 2/1988 |
| TW | 579507 | 3/2004 |

* cited by examiner

*Primary Examiner*—Sandra L O'Shea
*Assistant Examiner*—Danielle Allen
(74) *Attorney, Agent, or Firm*—Bacon & Thomas, PLLC

(57) ABSTRACT

A light source module adapted to a projecting device including a light bulb, a fan, and an air tunnel structure is provided. The fan is located by the light bulb for cooling the light bulb. The air tunnel structure is located respective to the location of the light bulb, for removing the heat generated by the light bulb. The air tunnel structure has a curved inner wall, a plurality of fins, and a tank. The curved inner wall is located inside the air tunnel structure respective to the location of the light bulb. The fins are formed on the curved inner wall for blocking the fragments generated by the explosion of the light bulb. The tank is located by a side of the curved inner wall for carrying the fragments clashing the fins.

14 Claims, 4 Drawing Sheets

LIGHT SOURCE MODULE OF PROJECTOR

BACKGROUND OF THE INVENTION (1) Field of the Invention

This invention relates to a light source module of a projector, and more particularly relates to a light source module capable of preventing fragments from shooting outward when the light bulb is broken.

(2) Description of the Prior Art

FIG. 1 is the schematic view of a typical projecting device. As shown in FIG. 1, the projecting device has a light source module 100, an image module 110, and a projecting module 300. The image module 110 transforms the input image signal into the imaging beams. The imaging beams are projected on a screen through the projecting module 300. The light source module 100 has a light bulb 120 providing light for generating the imaging beams.

The light bulb 120 of the light source module 100 should be bright enough to show the images clearly on the screen (not shown). However, the light bulb 120 generates great heat during lightening. If the heat may not be removed effectively, the life of the light bulb 120 will be shortened. Thus, as shown in FIG. 1, to remove the heat generated by the light bulb 120, the light source module 100 has a fan 160 and an air tunnel 140 in addition. The fan 160 is located by the light bulb 120, while the light bulb 120 is located at the air inlet 140a of the air tunnel 140. The air flow generated by the fan 160 may carry the heat generated by the light bulb 120 outside through the air tunnel 140.

However, during the lighting, the light bulb 120 may be broken because of the internal stress caused by temperature variation or external impact. When the light bulb 120 is broken, as the arrow in FIG. 1A shows, the fragments may be shot directly into the air tunnel 140, or hit the high-speed rotating fan 160 and then be shot into the air tunnel 140. These hot fragments shot into the air tunnel 140 hit the arc angle 140b of the air tunnel 140 and bounded outside, which may hurt human and damage the objects.

As FIG. 2 shows, to solve this problem, a typical way is to dispose a bulb cover 170 over the light bulb 120 to block the fragments. For heat dissipation demand, the bulb cover 170 needs to have openings formed thereon for the fan 160 to bring away the heat generated by the light bulb 120. Thus, the bulb cover 170 may not block all the fragments generated.

Moreover, as shown in FIG. 3, another way is to set a grey-color thermal-resistant foaming rubber layer 180 inside the air tunnel 140. The foaming rubber layer 180 is capable of absorbing the momentum of the fragments for preventing the fragments rebounded and leaving the air tunnel 140. However, the usage of the foaming rubber layer 180 not only increases the cost, its grey-color surface may turn into a glary light-reflecting surface under strong light from the light bulb 120, which may result in light leakage.

Thus, how to provide a safe light source module to avoid the damage to human and environmental objects by the explosion of the light bulb is an urgent problem for the projecting device industry.

SUMMARY OF THE INVENTION

An embodiment of the present invention is to provide a light source module to avoid the damage by the explosion of the light bulb.

A light source module adapted to a projecting device is provided in an embodiment of the present invention. The light source module has a light bulb, a fan, and an air tunnel structure. The fan is located by the light bulb for cooling the light bulb. The air tunnel structure is located respective to the location of the light bulb, for removing the heat generated by the light bulb. The air tunnel structure has a curved inner wall, a plurality of fins, and at least one tank. The curved inner wall is located inside the air tunnel structure and corresponding to the location of the light bulb. The fins are formed on the curved inner wall for blocking fragments generated by the explosion of the light bulb. The tank is located by a side of the curved inner wall for carrying the fragments clashing the fins.

Since there is a plurality of fins formed on the curved inner wall of the air tunnel structure for blocking the fragments generated by the explosion of the light bulb, the foaming rubber layer may be saved to reduce the fabrication cost. In addition, the fins formed on the curved inner wall is helpful for preventing the strong light of the light bulb form reflected by the curved inner wall to the environment. The problem of light leakage is thus resolved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The present invention will now be specified with reference to its preferred embodiment illustrated in the drawings, in which

FIG. 1A is a schematic view of the light source module of the typical projecting device in FIG. 1;

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having"

and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component directly or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 4:
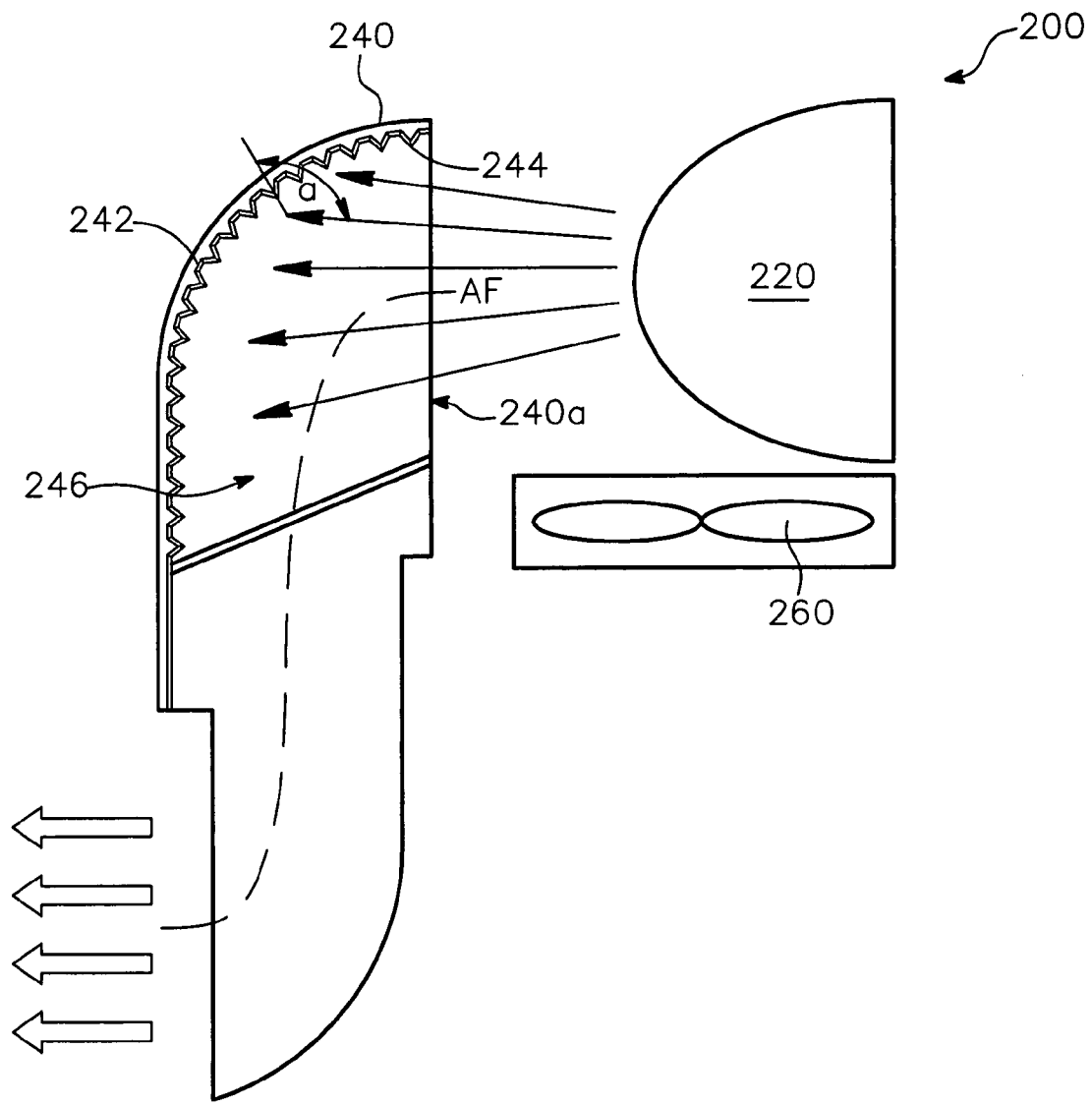
FIG. 4 is a schematic view showing a preferred embodiment of the light source module according to the present invention.
Figure 5:
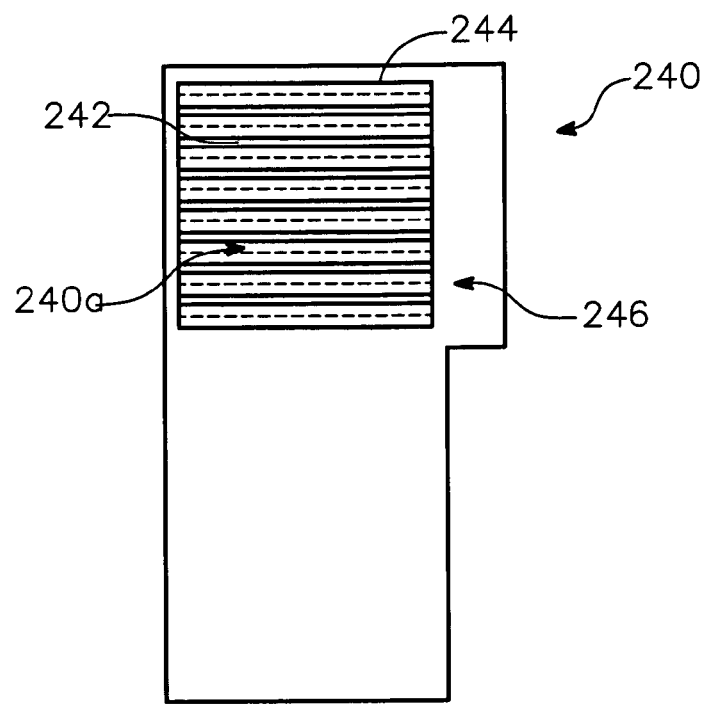
FIG. 5 is a right side view of the air tunnel structure in FIG. 4.

FIG. 4 is the schematic view showing a preferred embodiment of the light source module 200 applied in the projecting device according to the present invention. FIG. 5 is a side view of the air tunnel structure 240 in FIG. 4. As shown in FIG. 4, the light source module 200 has a light bulb 220, a fan 260, and an air tunnel structure 240. The fan 260 is located by the light bulb 220 to generate air flow for cooling the light bulb 220. The location of the light bulb 220 is respective to the location of the inlet 240a of the air tunnel structure 240. The air flow generated by the fan 260 flows through the air tunnel structure 240 to the environment for removing the heat generated by the light bulb 220.

Referring to FIG. 5 also, the air tunnel structure 240 has a curved inner wall 242, a plurality of fins 244, and a tank 246. For a preferred embodiment, the air tunnel structure 240 shows an S-shaped rectangular-pipe structure to avoid leaking light generated by the light bulb 220, and the location of the air tunnel structure 240 is respective to the location of the light bulb 220. Specifically, the location of the curved inner wall 242 is corresponding to the location of the light bulb 220 and the curved inner wall 242 is extended from the inlet 240a of the air tunnel structure 240 deep inside the air tunnel structure 240. A plurality of fins 244 is disposed on the surface of the curved inner wall 242 to change the rebounding direction of fragments clashing the fins 244, for preventing the fragments generated by the explosion of the light bulb 220 rebounded by the air tunnel structure 240 and shot outward. The tank 246 is located by a side of the curved inner wall 242 for carrying the fragments.

For a preferred embodiment, the front end of the curved inner wall 242 is adjacent to a side edge of the inlet 240a of the air tunnel structure 240. Moreover, the extending range of the curved inner wall 242 inside the air tunnel structure 240 is larger than the size of the inlet 240a, to ensure the fragments generated by the light bulb 220 entering the inlet 240a clash the curved inner wall 242, no matter directly be shot into the air tunnel structure 240 or hitting the high speed rotating fan 260 and then be shot into the air tunnel 240.

In this embodiment, each of the fins 244 extends from the curved inner wall 242 to the center of the air route AF. The fins 244 are substantially vertical to the air route AF of the air tunnel structure 240. That is to say, each of the fins 244 extends from the curved inner wall 242 to the center of the air route AF in the direction vertical to the curved inner wall 242, to ensure the fragments not exiting the outlet of the air tunnel structure 240 after clashing the fins 244. For a preferred embodiment, the angle a between the extending direction from each of the fins 244 to the center of the light bulb 220 and the extending direction of each of the fins 244 to the center of the air route AF is larger than 90 degree.

Furthermore, as shown in FIG. 5, in the present embodiment, each of the fins 244 traverses the curved inner wall 242 and a plurality of fins 244 is closely placed side by side on the surface of the curved inner wall 242 to ensure the fragments shot toward the curved inner wall 242 clashing the fins 244. However, the embodiment of the present invention is not so limited. The fins 244 may be arranged on the surface of the curved inner wall 242 in other ways, such as inclined arrangement, as long as the fragments clashing the fins 244 would not be directed to the outlet of the air tunnel structure 240.

Figure 6:
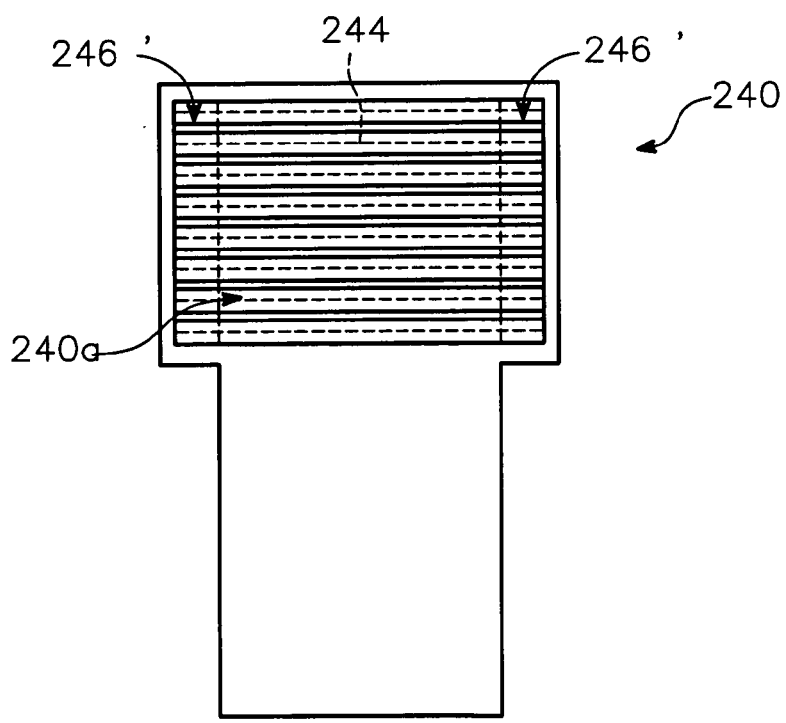
FIG. 6 is a schematic view showing another preferred embodiment of the air tunnel structure according to the present invention.

In addition, as shown in FIGS. 4 and 5, in this embodiment, the air tunnel structure 240 has a tank 246 disposed by the lower edge of the curved inner wall 242. Thus, the fragments clashing the fins 244 fall down into the tank 246 due to the gravity. However, this embodiment of the invention is not so limited. As shown in FIG. 6, inside the air tunnel structure 240, there are two tanks 246' disposed by the top and the bottom edges of the curved inner wall 242. Hence, no matter the projecting device is set upside up or upside down, the fragments clashing the fins 244 would be collected in the tank 246' due to the gravity.

Next, as shown in FIG. 5, in this embodiment, the tank 246 shows a closed groove to carry fragments. That is to say, there is a sidewall formed at the side of the tank 246 facing the light bulb 220. However, this embodiment of the invention is not so limited. The object of the tank 246 is to keep the fragments generated by the explosion of the light bulb 220 inside the projecting device. Thus, as shown in FIG. 6, the tank 246' may have an opening on the side thereof facing the light bulb 220 without interfering the object of the tank 246'. This opening is helpful for enlarging the size of the inlet 240a of the air tunnel structure 240 to increase the heat dissipation efficiency of the fan 260.

Figure 1:
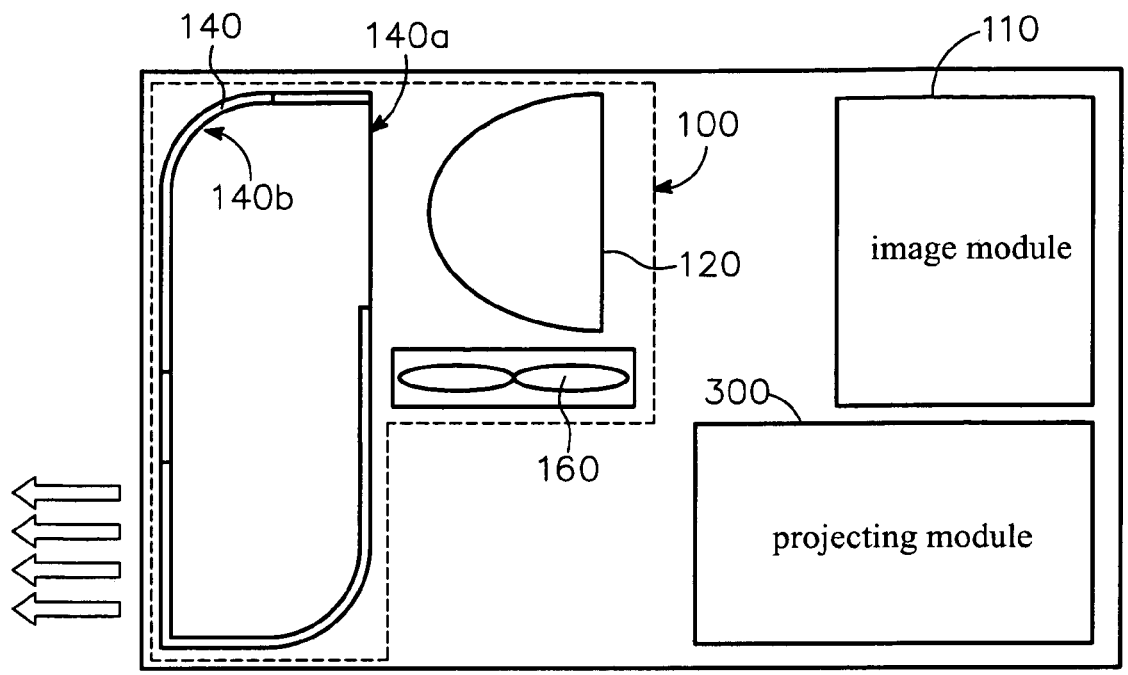
FIG. 1 is a schematic view of a typical projecting device.
Figure 1:
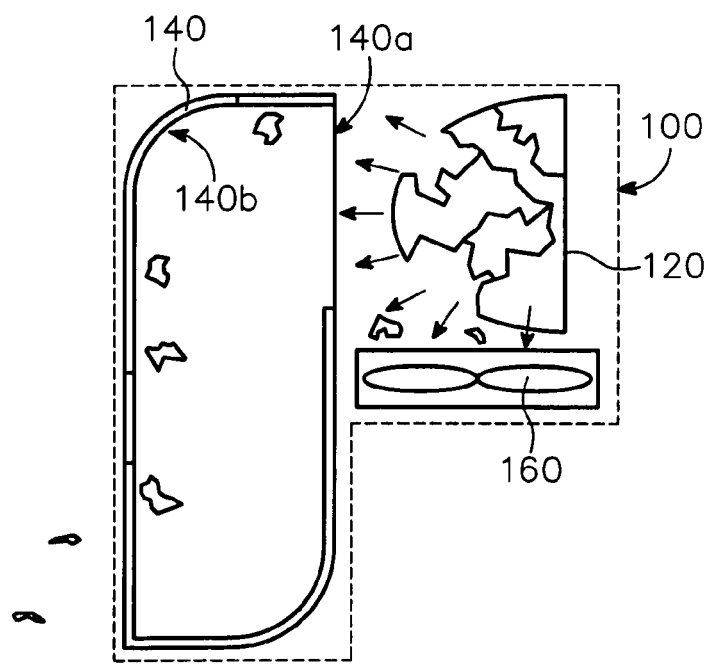
Figure 2:
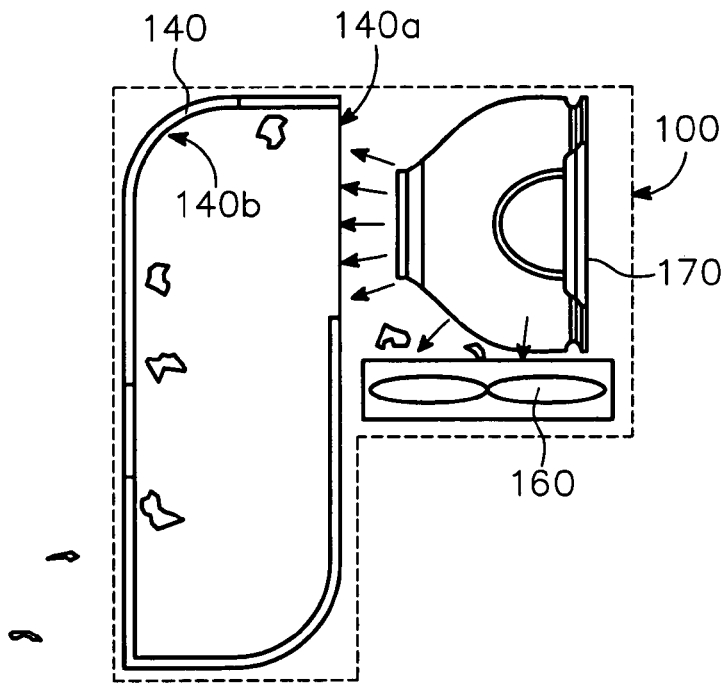
FIG. 2 is a schematic view of another typical light source module.
Figure 3:
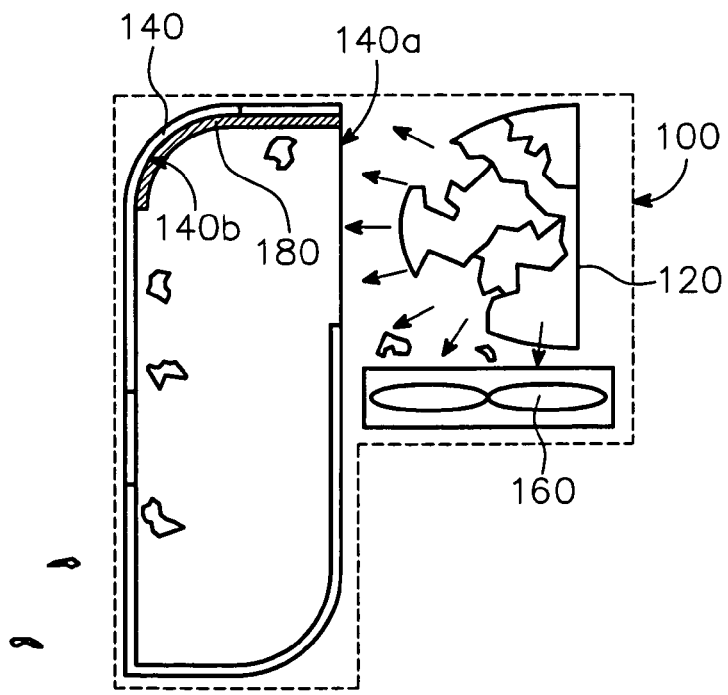
FIG. 3 is a schematic view of still another typical light source module.

Compared with the way shown in FIG. 3, which adopts the foaming rubber layer 180 to block the fragments generated by the explosion of the light bulb 120, in the air tunnel structure 240 shown in FIG. 4, the fins 244 are disposed on the surface of the curved inner wall 242 to block the fragments. Therefore, the foaming rubber layer 180 may be skipped to reduce the fabrication cost. In addition, the grey-color surface of the foaming rubber layer 180 shown in FIG. 3 may become a sparkling light-reflector. In comparison, as shown in FIG. 4, the fins 244 on the curved inner wall 242 reflect the light generated by the light bulb 220 inward to avoid the light directed to the outside, so that the problem of light leakage may be prevented.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, adapted to a projecting device, comprising:
    a light bulb;
    a fan, located by the light bulb for cooling the light bulb; and
    an air tunnel structure, respective to the location of the light bulb, for removing the heat generated by the light bulb, the air tunnel structure comprising:
        a curved inner wall, located inside the air tunnel structure and corresponding to the location of the light bulb;
        a plurality of fins, formed on the curved inner wall for blocking fragments generated by the explosion of the light bulb; and
        at least one tank, located by a side of the curved inner wall for carrying the fragments clashing the fins.

2. The light source module of claim 1, wherein a front edge of the curved inner wall is connected to a side edge of an inlet of the air tunnel structure.

3. The light source module of claim 1, wherein the fins are substantially vertical to an air route in the air tunnel structure.

4. The light source module of claim 1, wherein the fins are arranged side by side on a surface of the curved inner wall.

5. The light source module of claim 1, wherein the at least one tank are two tanks, disposed by two opposite sides of the curved inner wall respectively.

6. The light source module of claim 5, wherein each of the tanks has an opening on a side thereof facing the light bulb.

7. The light source module of claim 1, wherein the air tunnel structure shows a rectangular-pipe structure.

8. An air tunnel structure, capable of removing heat generated by a light bulb of a projecting device, comprising:
    a curved inner wall, located inside an air tunnel structure respective to the location of the light bulb;
    a plurality of fins, formed on the curved inner wall for blocking fragments generated by the explosion of the light bulb; and
    at least one tank, located by a side of the curved inner wall for carrying the fragments clashing the fins.

9. The air tunnel structure of claim 8, wherein a front edge of the curved inner wall is connected to a side edge of an inlet of the air tunnel structure.

10. The air tunnel structure of claim 8, wherein the fins are substantially vertical to an air route in the air tunnel structure.

11. The air tunnel structure of claim 8, wherein the fins are arranged side by side on a surface of the curved inner wall.

12. The air tunnel structure of claim 8, wherein the at least one tank are two tanks, disposed by two opposite sides of the curved inner wall respectively.

13. The air tunnel structure of claim 12, wherein each of the tanks has an opening on a side thereof facing the light bulb.

14. The air tunnel structure of claim 8, wherein the air tunnel structure shows a rectangular-pipe structure.

* * * * *